Sept. 9, 1930.  R. F. LACEY ET AL  1,775,566
MIXER
Filed Feb. 21, 1930   3 Sheets-Sheet 1

R.F. Lacey,
F.J. Lacey,
C.R. Lacey,
T.H. Lacey,
INVENTORS

BY Victor J. Evans
ATTORNEY

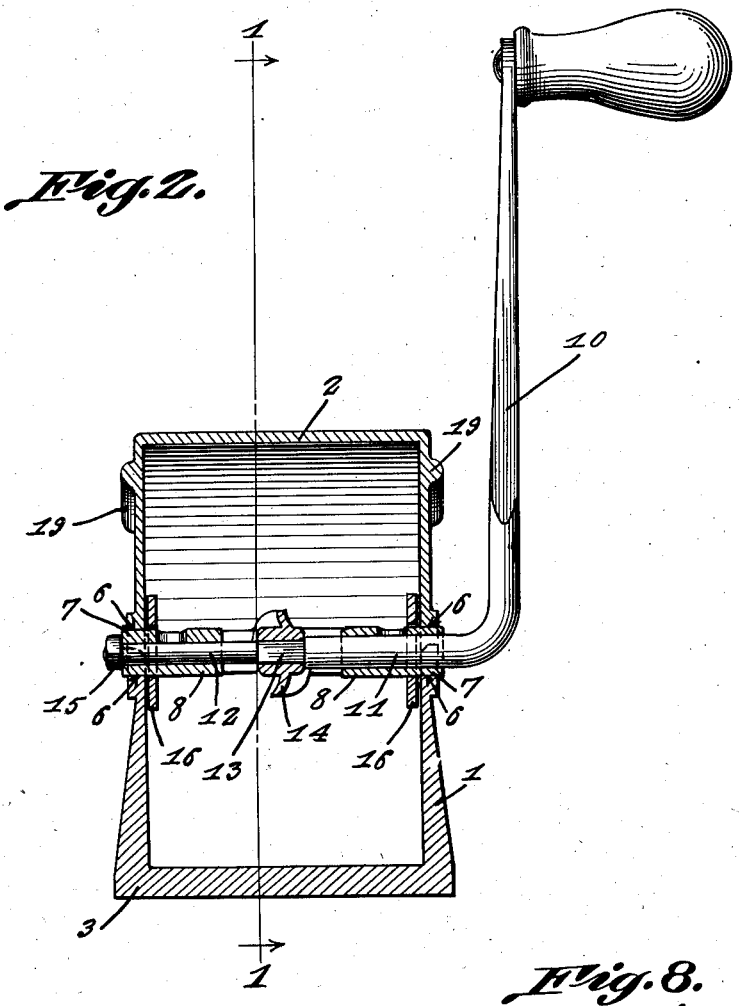
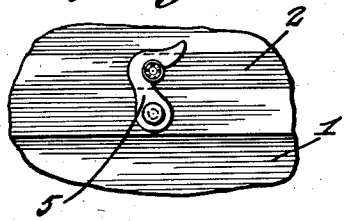
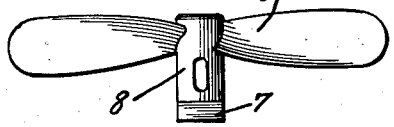

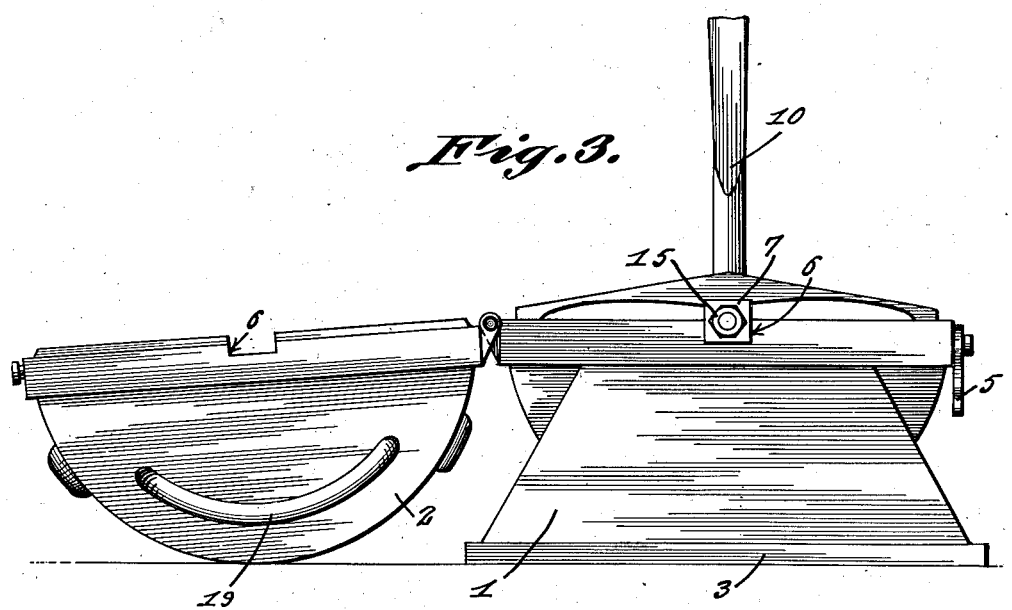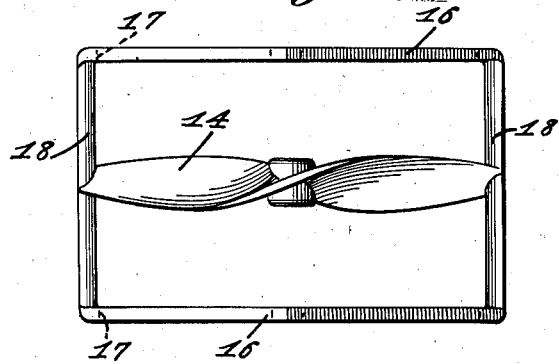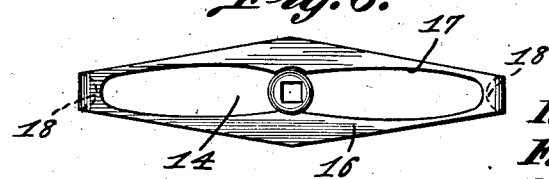

UNITED STATES PATENT OFFICE

ROBERT F. LACEY, FRANK J. LACEY, CLAREN R. LACEY, AND PAUL H. LACEY, OF POMONA, CALIFORNIA, ASSIGNORS TO MIN-ET PRODUCTS, INC., OF RENO, NEVADA, A CORPORATION OF NEVADA

MIXER

Application filed February 21, 1930. Serial No. 430,365.

This invention relates to a mixing device which is mainly designed for mixing coloring matter with oleomargarine, but which, of course, can be used for mixing other materials together, the general object of the invention being to provide means whereby the material is thoroughly, easily and quickly mixed by being placed in a bowl and a handle turned to rotate mixers which cooperate with stationary mixers to co-mingle the material.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a vertical sectional view.

Figure 3 is a side view showing the bowl in open position.

Figure 5 is a view of the central blade and the frame attached thereto.

Figure 6 is an edge view of Figure 5.

Figure 7 is a view of the latch means for latching the two halves of the bowl together.

Figure 8 is a view of one of the stationary blades.

Figure 1:
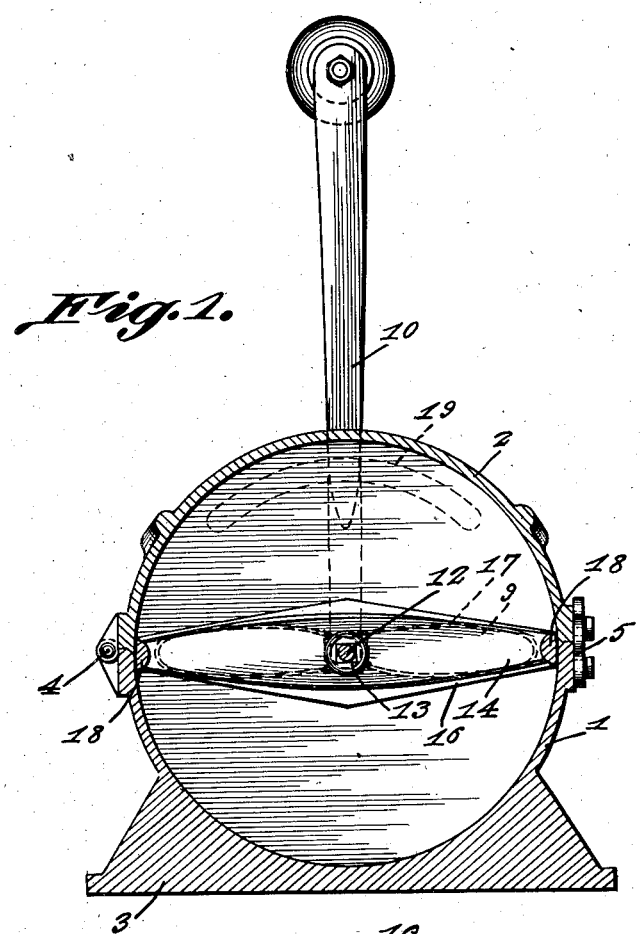
Figure 1 is a sectional view on line 1—1 of Figure 2.
Figure 4:
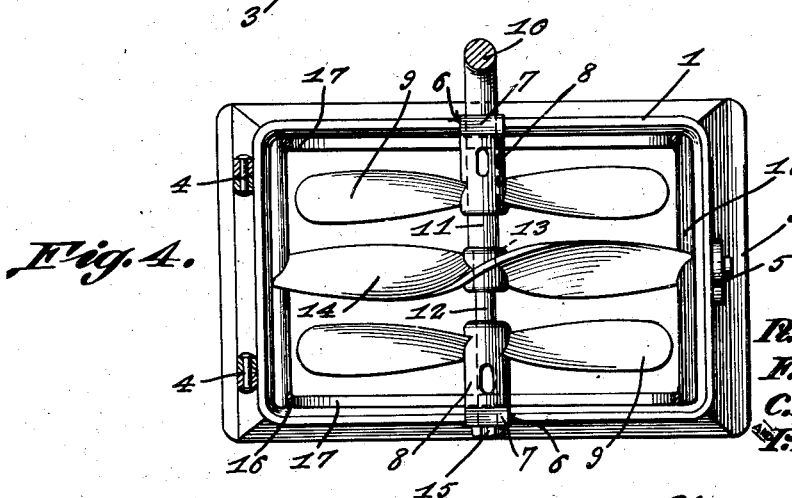
Figure 4 is a top plan view of the lower half of the bowl, with the mixing means therein.

In these drawings, the numeral 1 indicates the lower half of the bowl and the numeral 2 the upper half thereof, the lower half being provided with a base 3 and the two halves are hingedly connected together, as shown at 4. Latch means 5 are provided at the side of the bowl opposite to the hinge for fastening the two halves together. A notch 6 is formed at the center of the side edge of each half of the bowl, the notches at each side of the bowl forming a rectangular shaped opening to receive a square part 7 on the hub 8 of a stationary blade 9. A crank handle 10 has a shaft portion provided with a rounded part 11 for passing through the bore of the hub of one of the stationary blades and a reduced rounded part 12 adjacent its free end for passing through a smaller bore of the hub of the other stationary blade. The shaft has a square intermediate part 13 which passes through a square bore in the hub of a revolving blade 14. Thus it will be seen that the shaft passes through the hubs of both stationary blades in such a manner that it can rotate in said hubs, but the movable blade is fastened to the shaft so that it will revolve with the shaft. The stationary blades are held against rotation by their square portions fitting in the square openings in the ends of the bowl and the parts are held in assembled position by a nut 15 on the free extremity of the shaft.

A frame 16 has the central parts of its ends connected with the extremities of the rotary blade and the sides of this frame taper from the center toward each end, as shown in Figure 6, and each side is formed with an opening 17 so that a stationary blade can be passed through the frame with the central part of the frame rotatably arranged on a circular part of the hub of each stationary blade.

From the foregoing it will be seen that when the handle is turned, the central blade 14 will rotate with the shaft part of the handle and as the frame 16 is connected with the central blade, said frame will also rotate with the handle. The outer blades remain stationary. Thus the material is thoroughly mixed by the revolving and stationary parts, the frame acting to scrape the sides of the bowl and preventing the material from adhering thereto. We prefer to make the end parts of the frame semi-circular in cross section, as shown at 18, with the flat sides engaging the circular walls of the bowl.

When the device is to be used, the upper half is swung outwardly and downwardly, as shown in Figure 3 after the latch means are released and then the handle, with the stationary and movable blades and the frame 15 thereon, is removed and coloring matter is sprinkled in the bottom of the lower half of the bowl. A pound of oleomargarine is then cut in half and a half placed in each bowl. The beater assembly is then put back in the lower half and the upper half closed and latched. The handle is then turned to cause the beater assembly to mix the material. After the mixing operation has been completed, the top half of the bowl is again moved to open position and the beater assembly lifted out and it will be found that nearly all the material will be lifted out of the lower half with the said assembly.

Projections 19 are formed on the exterior walls of the upper half of the bowl to form hand holds for enabling the bowl to be held steady while the mixing operation is being carried out. Attention is called to the fact that the nut 15 which may, of course, be a cotter pin, acts to hold the entire beater assembly together. If desired, the bowl can be rotated by providing the same with a suitable handle and the middle blade and its frame held stationary.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:—

1. A mixer comprising a two-part bowl, means for hinging together the two parts at one side of the bowl, a latch at the oposite side for fastening the two parts together, the edges of the ends of the two parts having square notches therein, a pair of stationary blades, each having a hub formed with a square part to fit in the openings formed by each pair of notches whereby the blades are held against movement, a shaft passing through the hubs and rotatably arranged therein, a central blade having its hub fastened to the shaft, a frame having its ends connected with the extremities of the movable blade and the central part of its side portions rotatably arranged on the hubs of the stationary blades, said frame acting to scrape the walls of the bowl when the shaft is rotated, and a handle connected with one end of the shaft.

2. A mixer comprising a two-part bowl, means for hinging together the two parts at one side of the bowl, a latch at the opposite side for fastening the two parts together, the edges of the ends of the two parts having square notches therein, a pair of stationary blades, each having a hub formed with a square part to fit in the openings formed by each pair of notches whereby the blades are held against movement, a shaft passing through the hubs and rotatably arranged therein, a central blade having its hub fastened to the shaft, a frame having its ends connected with the extremities of the movable blade and the central part of its side portions rotatably arranged on the hubs of the stationary blades, said frame acting to scrape the walls of the bowl when the shaft is rotated, and a handle connected with one end of the shaft, said side portions of the frame having openings therein through which the stationary blades may pass.

3. A mixer of the class described comprising a bowl, a shaft passing through the bowl means whereby the shaft can be rotated, stationary blades in the bowl and having hubs supported by the bowl to hold the blades against rotary movement the shaft passing through the hubs and being journaled therein, a blade attached to the shaft and rotatable therewith and a rectangular frame having its end portions connected with the extremities of the movable blades and side portions rotatably mounted on the hubs of the stationary blades.

In testimony whereof we affix our signatures.

ROBERT F. LACEY.
FRANK J. LACEY.
CLAREN R. LACEY.
PAUL H. LACEY.